United States Patent [19]

Yokotsuka

[11] Patent Number: 4,490,018
[45] Date of Patent: Dec. 25, 1984

[54] PHOTOGRAPHIC LENS WITH VARIABLE RANGE FOCUS ADJUSTMENT

[75] Inventor: Akio Yokotsuka, Tokyo, Japan
[73] Assignee: Kino Precision Industries, Ltd., Tokyo, Japan
[21] Appl. No.: 440,614
[22] Filed: Nov. 10, 1982

[30] Foreign Application Priority Data

Mar. 12, 1982 [JP] Japan .............................. 57-33990[U]

[51] Int. Cl.³ ............................................. G02B 7/11
[52] U.S. Cl. ...................................... 350/429; 350/255
[58] Field of Search ........................ 350/429, 430, 255

[56] References Cited

U.S. PATENT DOCUMENTS

4,139,268  2/1979  Litman ................................. 350/255
4,166,675  9/1979  Kanno ................................. 350/255

*Primary Examiner*—John K. Corbin
*Assistant Examiner*—P. M. Dzierzynski
*Attorney, Agent, or Firm*—Fulwider, Patton, Rieber, Lee & Utecht

[57] ABSTRACT

A photographic lens including a focus ring rotatable between prescribed end limits corresponding respectively with an infinite focus setting and a relatively close focus setting is provided with an adjustable range stop assembly for selectively setting one end limit at a position corresponding with a focus setting at which scenes or events are anticipated by the photographer. In one preferred form, the range stop assembly comprises a selector switch carried by the focus ring for movement of a control pin between stops on the lens housing wherein one of the stops is defined by a plurality of lands at different circumferential positions whereby the permissible range of focus ring rotation is selected in accordance with the position of the control pin. In an alternative preferred form, the focus ring adjustment is controlled by a pair of control pins movable between associated stops to limit ring rotation between the infinity and close focus positions, wherein one of the control pins can be adjustably repositioned in the circumferential direction to alter one end limit of the permitted range of focus ring rotation.

33 Claims, 13 Drawing Figures

Fig. 9

PHOTOGRAPHIC LENS WITH VARIABLE RANGE FOCUS ADJUSTMENT

BACKGROUND OF THE INVENTION

This invention relates generally to improvements in photographic lenses of the variable focus type. More particularly, this invention relates to a novel photographic lens including means for selecting one end limit of the focus adjustment range to correspond with a focus setting desired by the photographer.

Variable focus photographic lenses in general are well known to include one or more lens elements supported within a lens housing for appropriate movement to focus an image with respect to a camera or the like. A focus ring is carried for rotation about the lens housing and is mechanically coupled to one or more of the lens elements for axially displacing the lens elements to adjust the focus setting of the photographic lens. Focus adjustment is normally permitted within a prescribed range typically between an infinite focus setting and a relatively close focus setting, with a control pin on the focus ring being movable between fixed stops on the lens housing to limit rotational movement of the focus ring.

During normal use of the photographic lens, the photographer rotates the focus ring to the appropriate focus setting prior to taking a picture. The proper focus setting, however, must be checked visually particularly at positions intermediate the infinite and minimum settings either by looking through a viewfinder to determine the image clarity or by inspecting distance index markings normally provided on the lens housing. Unfortunately, the time required to visually check the focus setting may result in the photographer missing rapidly occurring scenes or events.

In some instances, the photographer can anticipate the occurrence of scenes or events at different distances from the camera but lacks the physical ability to adjust the focus setting with sufficient speed to photograph these scenes or events. For example, sports events are typefied by action which may occur in rapid sequence and at different distances from the photographer, wherein at least some of these distances can be anticipated in advance. However, in a conventional photographic lens, it has not been possible to focus rapidly from one scene to another, since the time-consuming visual focus check is still required before the picture can be taken.

There exists, therefore, a significant need for an improved photographic lens which can be quickly and easily switched from one focus setting to an adjustably selected alternative focus setting without requiring a visual focus check before a picture can be taken. The present invention fulfills this need and provides other related advantages.

SUMMARY OF THE INVENTION

In accordance with the invention, a photographic lens of the variable focus type is provided with an adjustable range stop assembly for selectively altering the permissible range of focus adjustment. The range stop assembly can be adjusted to provide a preselected end limit to rotation of a focus ring at a selected focus setting corresponding with a distance position at which scenes or events are anticipated by the photographer. The range stop assembly thus provides a mechanical stop indicating when the selected focus setting is reached thereby permitting rapid focus adjustment to the selected setting without requiring any visual check prior to taking a photograph.

The variable focus photographic lens conventionally includes one or more lens elements supported within a lens housing for movement to alter the lens focus setting in response to rotation of a focus ring carried about the lens housing. Rotation of the focus ring is normally limited to a prescribed range to permit movement of the lens elements between an infinity focus setting position and a minimum focus setting position typically on the order of about one foot.

In accordance with one form of the invention, the range stop assembly comprises a selector switch mounted on the focus ring for axial displacement. The selector switch carries a control pin which projects radially inwardly at a position circumferentially between a pair of stops on the lens housing, wherein the stops are engageable by the control pin to define end limits to focus ring rotation. One of these stops is divided into a plurality of circumferentially and axially spaced lands, such that the range of focus adjustment is altered by axial displacement of the selector switch to determine which land is engageable by the control pin.

In a preferred construction, the circumferentially and axially spaced lands correspond respectively with the infinity focus setting and with progressively shorter focus settings closer to the minimum focal length position. Accordingly, by appropriate positioning of the selector switch the focal length of the photographic lens can be adjusted between the minimum focus setting and a selected longer focal length.

In an alternative form of the invention, the focus ring is divided into a primary ring and a selector ring normally rotatable together to adjust the lens focus setting wherein the rings are associated respectively with a pair of control pins positioned circumferentially between associated stops which limit focus ring rotation between positions corresponding with the infinity and minimum focus setting positions. The selector ring is further rotatable with respect to the primary ring to adjust the position of the control pin associated with the selector ring relative to the corresponding stops, thereby altering one end limit of the focus ring adjustment range. In a preferred form, the altered end limit corresponds with shorter focus setting positions whereby the photographic lens is adjustable between the infinity focal length and a selected shorter focal setting.

Other features and advantages of the present invention will become more apparent from the following detailed description and accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, a photographic lens referred to generally by the reference numeral 10 includes a range stop assembly 12 for selectively adjusting the permitted range of rotational movement of a focus ring 14 which is coupled to one or more optical lens elements 16 to adjust the focus setting of the lens. More particularly, the range stop assembly 12 is adjustable to select one end limit to focus ring rotation at a selected focus setting thereby permitting rapid and accurate focus adjustment to the selected focus setting.

The photographic lens 10 including the range stop assembly 12 constitutes a substantial improvement over conventional photographic lenses wherein a focus ring is rotatable between fixed end limits corresponding with an infinite focus setting position and a minimum focus setting position, typically on the order of about one foot. With such conventional lenses, when it is desired to photograph an object located at an intermediate distance, it is necessary to rotate the focus ring to the appropriate intermediate rotational position while visually checking the focus setting either by observing the image clarity through a viewfinder or by reference to index markings on the lens housing. Visual checking of the focus setting, however, is a relatively time-consuming procedure which may cause the photographer to miss events or scenes occurring rapidly, in spite of the fact that the photographer might be able to anticipate the position at which the scene or event will occur. In the present invention, the range stop assembly permits adjustment of one end limit of focus ring rotation to a predetermined position corresponding with a focus setting at which action is anticipated by the photographer. The photographer can, therefore, photograph other scenes or events in a normal manner and rapidly rotate the focus ring to the preselected end limit without visually checking the focus setting when the anticipated action occurs.

One preferred form of the photographic lens 10, including the range stop assembly 12 of this invention, is illustrated by way of example in FIGS. 1–6. As shown, the photographic lens 10 is generally conventional in form to include a generally cylindrical fixed housing portion 18 which provides a support structure for the optical lens elements 16 and other components of the lens 10 and further includes an adapter ring 20 of appropriate size and shape for connection to a camera (not shown). More particularly, as shown best in FIG. 2, the fixed housing portion 18 includes a threaded inner diameter surface 22 of relatively small lead angle for meshing engagement with an outwardly presented threaded surface 24 of an annular adjustment ring 26. The adjustment ring 26 is in turn connected as by screws 28 to a flange 30 radiating inwardly from the focus ring 14 which has a generally cylindrical shape and is carried about the exterior of the lens. With this construction, the focus ring 14, which may include an easily grasped textured outer hand grip 15, is rotatable along with the adjustment ring 26 with respect to the fixed lens housing portion 18.

Figure 1:
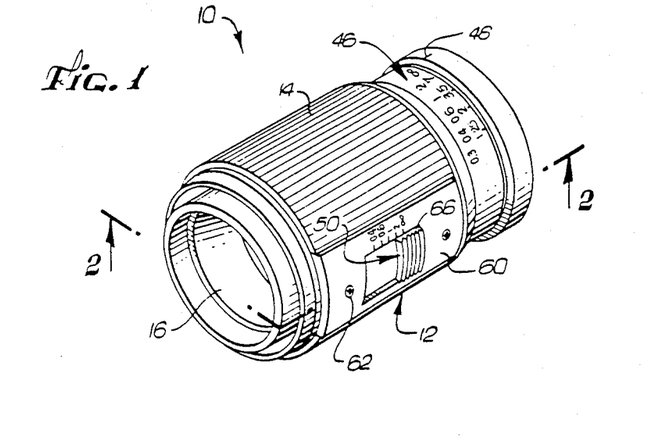
FIG. 1 is a perspective view illustrating a photographic lens including an adjustable range stop assembly embodying the novel features of the invention.
Figure 2:
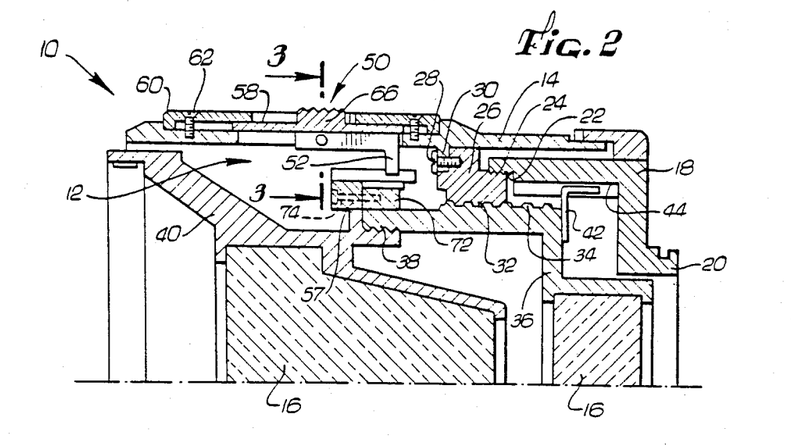
FIG. 2 is a longitudinal vertical section taken generally on the line 2—2 of FIG. 1.
Figure 3:
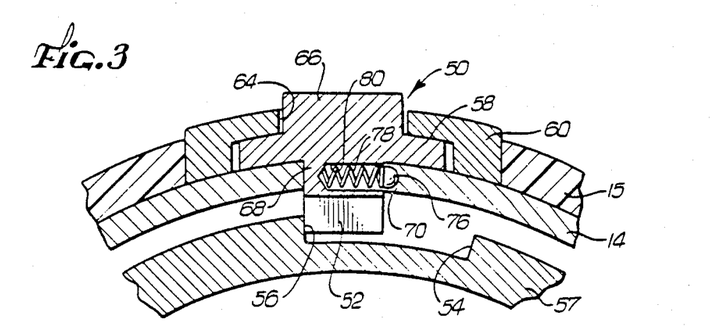
FIG. 3 is an enlarged fragmented vertical section taken generally on the line 3—3 of FIG. 2.
Figure 4:
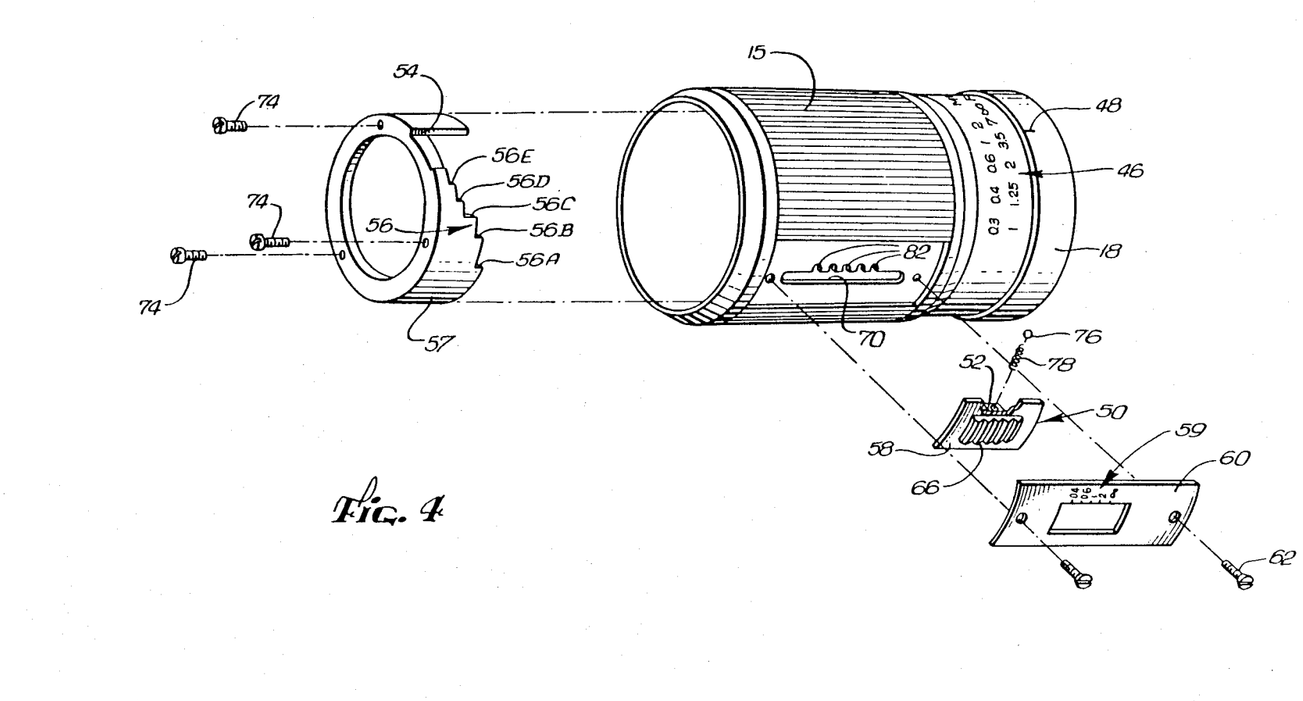
FIG. 4 is an exploded perspective view illustrating construction details of the invention.

The adjustment ring 26 has an inner diameter surface defined by a helicoid track 32 of relatively large lead angle for meshing engagement with a helicoid track 34 formed about a mounting tube 36 carrying one of the optical elements 16. This mounting tube 36, as shown in the illustrative drawings, may be secured as by interengaging threads 38 to a forward mounting tube 40 which supports another optical lens element 16. In any event, the mounting tubes 36 and 40 are constrained against rotational movement with respect to the fixed housing portion 18 by a key 42 secured to the mounting tube 36 and projecting into an axially elongated slot 44 on the fixed housing portion. Accordingly, rotation of the focus ring 14 about the fixed housing portion 18 axially displaces the mounting tubes 36 and 40 as well as their associated lens elements 16 to adjust the focus setting of the lens elements, all in a well-known manner. The precise focus setting of the lens elements 16 is indicated by a numerical index scale 46 on the focus ring 14 which moves in relation to an index line 48 on the fixed housing portion 18 when the focus ring is rotated. This index scale 46 indicates a normal range of focus adjustment between an infinite focus setting position and a relatively close or minimum focus setting position, typically on the order of about one foot, as depicted in the exemplary drawings.

The rotational movement of the focus ring 14 between the infinite and minimum focus setting positions, or some lesser range of rotation, is selectively controlled by the range stop assembly 12. This range stop assembly 12 includes a selector switch 50 mounted on the focus ring 14 and supporting a control pin 52 which projects radially inwardly to a position circumferentially between a pair of circumferentially spaced stops 54 and 56 on a stop ring 57. Importantly, the stop 56 comprises a stairstep configuration including a plurality of circumferentially and axially spaced lands 56a, 56b, 56c, 56d, and 56e which cooperate with the control pin 52 to permit selective adjustment of the permitted range of focus adjustment.

More particularly, the selector switch 50 comprises a slide switch mechanism having a relatively thin plate 58 supported on the exterior of the focus ring 14 by a rectangular retainer frame 60 which can be secured to the focus ring by screws 62 or the like and which includes a central opening 64 through which a finger-engageable textured button 66 may project. The selector switch 50 further includes a base portion 68 disposed for sliding movement in an axially elongated slot 70 in the focus ring. The base portion 68 is formed integrally with the control pin 52 which projects radially inwardly to a position circumferentially between the stops 54 and 56.

The stop ring 57 comprises an annular, generally sleeve-shaped component secured to an outer flange 72 on the mounting tube 36 by a plurality of screws 74 or the like. The stop ring is shaped to include an outwardly and rearwardly open arcuate recess bounded at one circumferential margin by the stop 54 which extends axially throughout its length and at the opposite circumferential margin by the other stop 56 which includes the lands 56a through 56e. These stops 54 and 56 are disposed for engagement by the control pin 52 on the selector switch 50 as the focus ring 14 is rotated, whereby the stops provide mechanical end limits to focus ring rotation.

Figure 5:
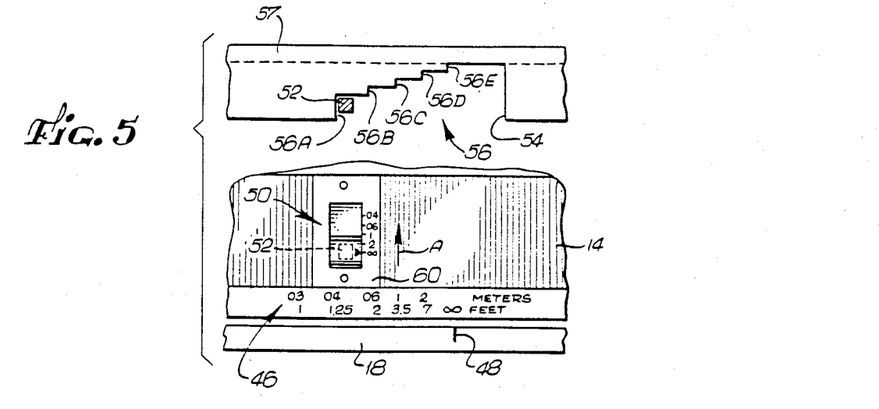
FIGS. 5 and 6 are enlarged, exploded, and somewhat schematic developed plan views illustrating normal adjustment of lens focal range between an infinite focus setting and a minimum focus setting.
Figure 6:
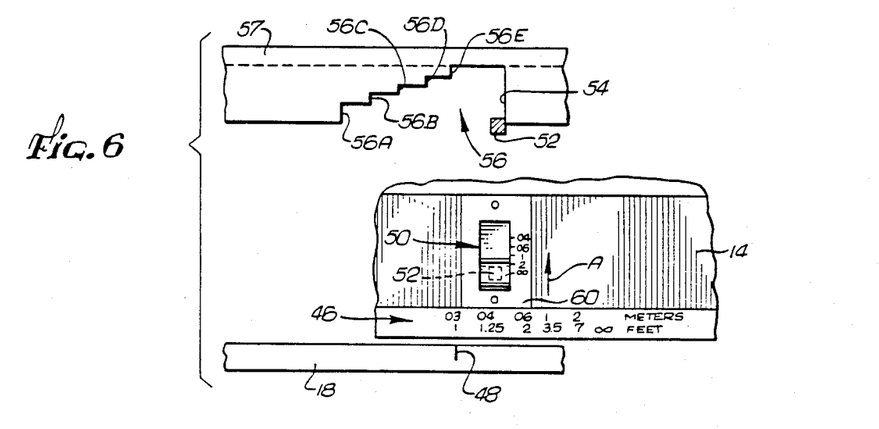
Figure 7:
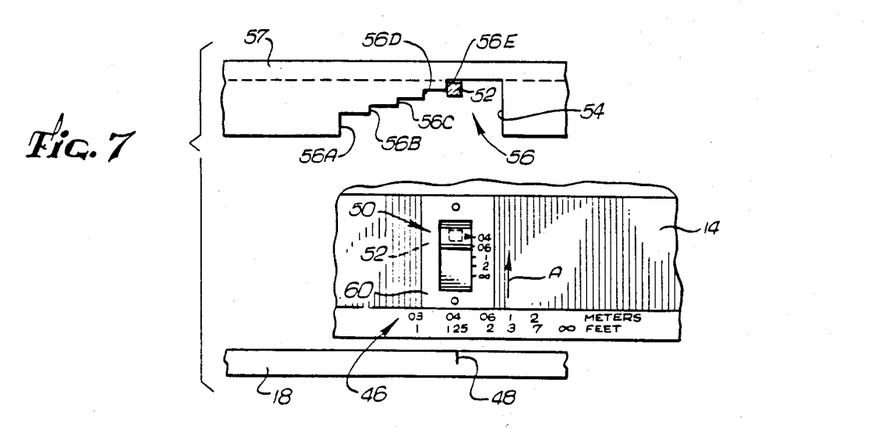
FIG. 7 is an enlarged, exploded, and somewhat schematic developed plan view similar to FIGS. 5 and 6 illustrating operation of the range stop assembly to restrict lens focus adjustment range between a minimum focus setting and a selected alternative focus setting less than the infinite focus setting.

In the illustrative embodiment, as shown best in FIGS. 5-7, the stop 54 is engageable by the control pin 52 when the focus ring 14 is in a minimum focus setting, whereby the stop 54 corresponds with a minimum focus setting for the lens irrespective of the axial position of the selector switch 50. On the other hand, the stop 56 is engageable by the control pin when the focus ring 14 is in a maximum focus setting, but the specific range of this maximum focus setting is selected by appropriate positioning of the selector switch 50 for engagement by the control pin 52 with a selected one of the axial lands 56a through 56e. Alternatively, the stops 54 and 56 can be reversed to respectively correspond with maximum and minimum focal length settings, if desired.

More specifically, when the selector switch 50 is moved to an axial position for engagement of the control pin 52 with the land 56a, the focus ring 14 can be rotated through an angular increment of about 90 degrees for full range adjustment of the focus setting between the infinite setting and the minimum setting, as shown in FIGS. 5 and 6. However, as the selector switch 50 is moved axially toward the front of the lens, as shown by arrow A in FIS. 5-7, the control pin 52 is moved forwardly for engagement with one of the other lands, such as the land 56e as shown in FIG. 7, to permit focus adjustment between the minimum focus setting position and a selected longer focus setting position less than the infinite position. Importantly, since the stop ring 57 displaces axially at least a few millimeters in response to focus ring rotation, the lands 56a through 56e are configured with sufficient axial depth to prevent the selected land from moving out of axial alignment with the control pin 52.

Axial movement of the selector switch 50 is controlled by a ball and detent mechanism including a ball 76 biased by a spring 78 to project partially from a bore 80 in the base portion 68 of the selector switch. The ball 76 projects into association with one of a plurality of axially spaced detents 82 lining one margin of the slot 70 in the focus ring 14, whereby these detents are positioned to correspond with alignment between the control pin 52 and associated ones of the lands 56a through 56e. Indicia referred to by arrow 59 in FIG. 4 may be provided on the retainer frame 60 to indicate the focus setting selected by the selector switch 50.

The photographic lens 10 including the range stop assembly 12 of this invention is thus quickly and easily adjustable to select the range of focus adjustment, wherein one end limit of the adjustment range is preselected to correspond with a focus setting at which action is anticipated, thereby permitting rapid and accurate adjustment of the focus setting to the selected end limit without requiring any visual inspection or checking of the focus setting before a picture can be taken. The photographer can thus use the photographic lens for taking pictures in a conventional manner, yet quickly and accurately readjust focus setting to the predetermined position when anticipated action occurs.

An alternative form of the invention is illustrated in FIGS. 8-13 wherein a modified photographic lens 100 is shown to include an alternative range stop assembly 102 for selectively adjusting the range of focus setting adjustment. Conveniently, for ease of description and consistency with the embodiment described above with respect to FIGS. 1-7, components provided in the modified lens 100, which are identical with those shown and described with respect to the embodiment of FIGS. 1-7, will be referred to by common primed reference numerals.

Figure 8:
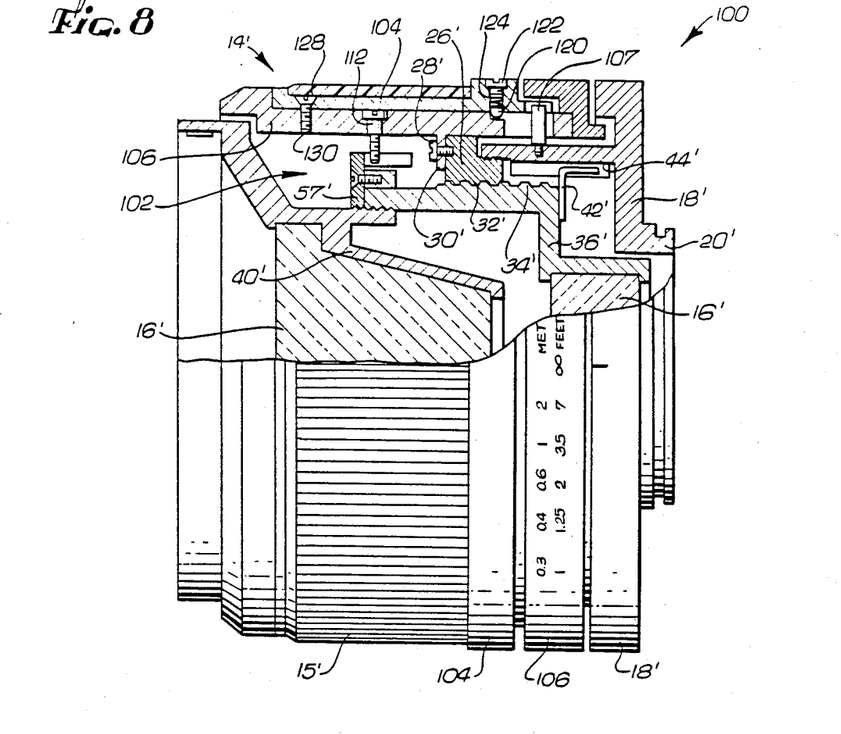
FIG. 8 is a side elevation view of a photographic lens in accordance with an alternative embodiment of the invention, with portions broken away to show in vertical section, construction details of the lens.

As shown in FIG. 8, the modified photographic lens 100 includes a fixed housing portion 18' having an adapter ring 20' for connection to a camera (not shown). The fixed housing portion 18' threadably supports an annular adjustment ring 26' which, as in the previous embodiment, includes a helicoid track 32' in engagement with a mating track 34' on a lens mounting tube 36' supporting an optical lens element 16'. The mounting tube 36' is in turn secured to a front mounting tube 40' which supports a second optical lens element 16'.

The optical lens elements 16' are displaced axially to adjust the lens focus setting in response to rotation of the adjustment ring 26'. In this regard, the adjustment ring 26' is secured as by screws 28' to an inwardly radiating flange 30' on a focus ring 14'. Movement of the lens elements 16' is confined to axial movement only by a key 42' secured to the mounting tube 36' and received into an axially extending slot 44' in the fixed housing portion 18'.

Figure 9:
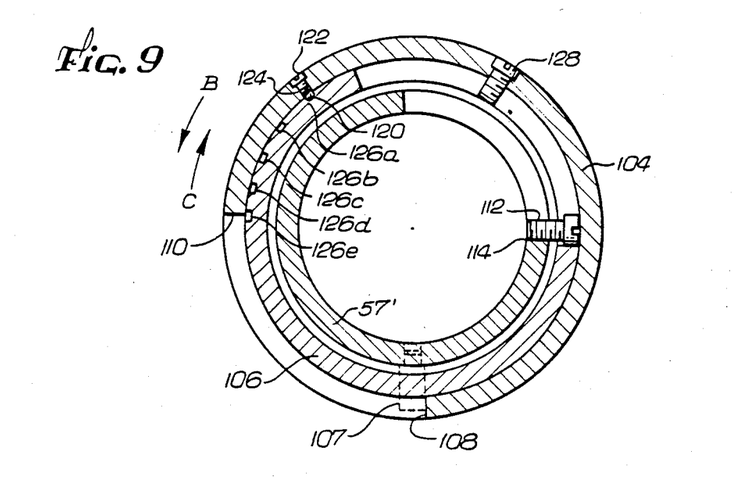
FIG. 9 is a somewhat schematic vertical section of the photographic lens to illustrate constuction details thereof.

In the modified photographic lens 100, the focus ring 14' is provided in the form of an outer selector ring 104 and an inner primary ring 106, wherein the selector ring 104 may support an external hand grip 15' of roughened surface texture, and the primary ring 106 in the illustrative embodiment carries the flange 30' secured to the adjustment ring 26'. The fixed housing portion 18' supports a control pin 107 to project radially outwardly between a circumferentially spaced pair of stops 108 and 110 on the fixed housing portion 18', whereas the primary ring 106 supports a control pin 112 to project radially inwardly between a circumferentially spaced pair of stops 114 and 116 defined by a stop ring 57' secured about the mounting tube 36'. These pairs of stops 108, 110 and 114, 116, as shown in FIG. 9, are positioned at substantially identical arcuate distances from each other wherein these arcuate distances permit rotation of the selector and primary rings 104 and 106 together for adjusting the lens focus setting between a minimum focus setting position and an infinite focus setting position, as will be described in more detail.

The selector and primary rings 104 and 106 are releasably locked against rotation relative to each other by a ball and detent mechanism including a ball 120 urged by a spring 122 to project partially from a bore 124 in the selector ring 104 into one of a plurality of circumferentially spaced detents 126a, 126b, 126c, 126d, and 126e in the primary ring 106. A limit pin 128 projecting inwardly from the selector ring 104 and received into a short circumferential slot 130 in the primary ring 106 conveniently prevents overrotation of the two rings 104 and 106 relative to each other.

Figure 10:
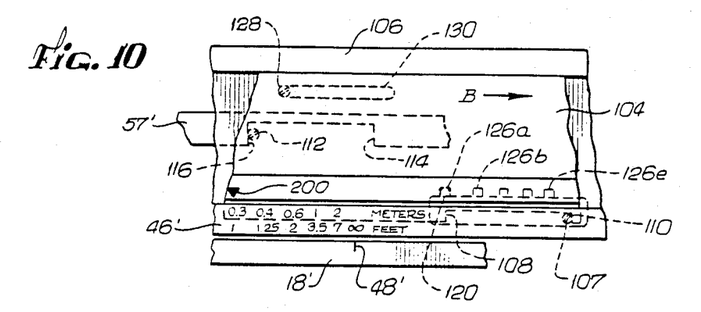
FIGS. 10 and 11 are enlarged, fragmented, and somewhat schematic developed plan views illustrating normal adjustment of the lens between an infinite focus setting and a minimum focus setting.
Figure 11:
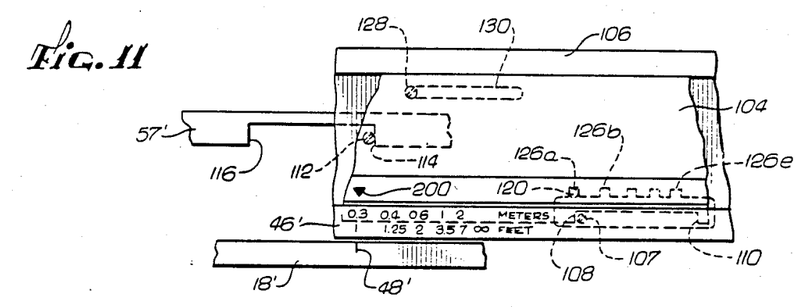
Figure 12:
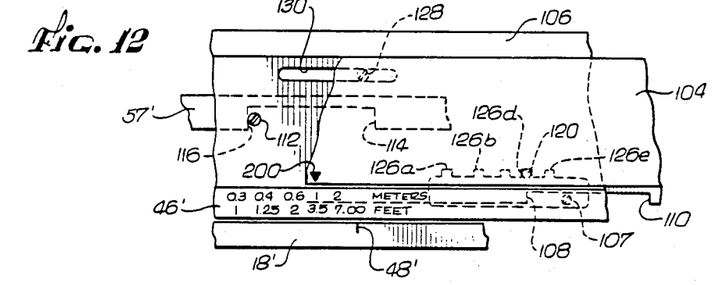
FIGS. 12 and 13 are enlarged, fragmented, and somewhat schematic developed plan views of the lens generally similar to FIGS. 10 and 11, but illustrating operation of a range stop assembly to limit focus adjustment between an infinity focal length position and a shorter focal length position greater than the minimum focal length position.
Figure 13:
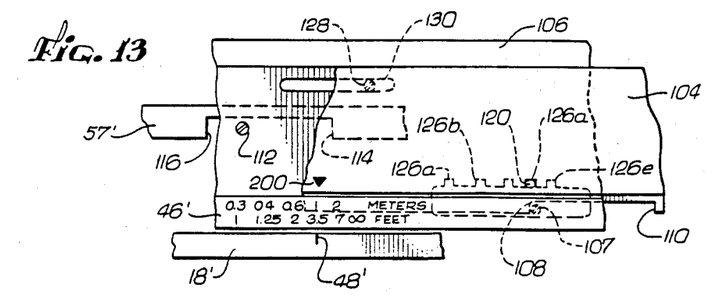

During normal operation of the photographic lens 100, as illustrated in FIGS. 10 and 11 with the ball 120 seated within the detent 126a, the selector and primary rings 104 and 106 are rotatable together as a unit, to move the stops 108, 110 relative to the control pin 107 and to move the control pin 112 between the pair of stops 114, 116. At one end limit, as shown in FIG. 10, the selector and primary rings 104 and 106 position the lens elements 16' in an infinite focus setting position, as indicated by the position of a numerical index scale 46' on the primary ring 106 with respect to an index line 48' on the fixed housing portion 18'. At the opposite end limit of rotation, as viewed in FIG. 11, the lens is in a minimum focus setting position as indicated by the position the numerical index scale 46' relative to the index line 48'.

When adjustment of the focus range is desired, the selector ring 104 is rotated relative to the primary ring 106, as illustrated by arrow "B" in FIG. 10, to position the detent ball 120 in a different one of the detents 126a through 126e in the primary ring. This relative rotation alters the position of the stops 108, 110 with respect to the associated control pin 107 without altering the position of the control pin 112 relative to its stops 114, 116. Accordingly, when the selector and primary rings 104 and 106 are again rotated together to select the specific lens focus setting, the control pin 107 on the fixed housing portion 18' will engage the stop 108 before the control pin 112 will engage the stop 114, thereby modifying the end limit of focus range adjustment. In the illustrated embodiment, the end limit which is modified corresponds with shorter focus settings, whereby the lens is adjustable between an infinity or maximum focus setting and a selected shorter focus setting. However, if desired, the photographic lens 100 can be readily altered for permitting adjustment between a minimum focus setting and a selected longer setting. In any event, however, the permitted degree of focus range adjustment is selected by the magnitude of relative rotation between the selector ring 104 and the primary ring 106, wherein the particular setting of the adjustable end limit is conveniently indicated by an arrow 200 on the selector ring 104 in association with the index scale 46'0 on the primary ring.

In use, the photographic lens 100 is used generally in the same manner as the embodiment described with respect to FIGS. 1-7. More particularly, one end limit of ring rotation is preselected by appropriately rotating the selector ring 104 relative to the primary ring 106 to set the end limit at a selected focus setting position. Focus adjustment may then be performed in a normal manner within the selected range with the axial dimensions of the stops 114, 116 conveniently being of sufficient depth to prevent the control pin 112 from becoming axially misaligned with the stops as the stop ring 57' is moved slightly in the fore-aft direction during focus adjustment.

A variety of modifications and improvements to the invention described herein are believed to be apparent to one skilled in the art. Accordingly, no limitation on the invention is intended, except by way of the appended claims.

What is claimed is:

1. A photographic lens with variable range focus setting adjustment, comprising:

a generally cylindrical lens housing supporting at least one optical lens element for axial displacement therein to adjust the focus setting of the photographic lens;

a focus ring rotatable about said lens housing and operably coupled to displace said at least one lens element through a range of focus settings in response to focus ring rotation; and a range stop assembly for limiting focus ring rotation to a prescribed range of movement relative to said lens housing to correspondingly limit the permitted range of focus setting adjustment, said range stop assembly including a pair of circumferentially spaced end limits formed cooperatively between said lens housing and said focus ring, said end limits respectively defining the opposite ends of the prescribed range of focus ring rotational movement and including means for preventing focus ring rotation beyond said prescribed range, said range stop assembly further including means accessible from the exterior of said focus ring for selectively altering the rotational position of one of said end limits to correspondingly alter the circumferential spacing between said end limits and thereby alter the permitted range of focus setting adjustment.

2. The photographic lens of claim 1 wherein said range stop assembly comprises first and second circumferentially spaced stops on one of said lens housing and focus ring, said first stop including a plurality of circumferentially and axially spaced lands, a control pin on the other of said lens housing and focus ring positioned between said first and second stops for respective engagement therewith when said focus ring is rotated to said end limits, and means for axially displacing said control pin for axial alignment with a selected one of said lands of said first stop thereby selecting the rotational position of one of said end limits.

3. The photographic lens of claim 2 wherein said first and second stops are formed on said lens housing and said control pin is carried by said focus ring.

4. The photographic lens of claim 3 wherein said means for axially displacing said control pin comprises a selector switch mounted in an accessible position on said focus ring for axial sliding movement with respect thereto, said control pin being carried by said selector switch and projecting therefrom generally radially inwardly between said first and second stops.

5. The photographic lens of claim 4 further including means for releasably securing said selector switch in one of a plurality of axial positions each corresponding with alignment of said control pin with a respective one of said lands.

6. The photographic lens of claim 2 wherein said focus ring is rotatable between a minimum focus setting when said control pin is in engagement with said second stop and a selected longer focus setting when said control pin is in engagement with a selected one of said lands.

7. The photographic lens of claim 3 wherein said first and second stops are formed on a stop ring movable axially with said at least one lens element in response to focus ring rotation, said second stop and each of said lands having sufficient axial dimension to maintain said control pin in axial alignment circumferentially between said second stop and said selected one of said lands throughout rotation of said focus ring between said end limits.

8. The photographic lens of claim 1 wherein:

said focus ring comprises a primary ring and a selector ring rotatable relative to each other and one being coupled to displace said lens element, and means for releasably securing said primary and selector rings against rotation relative to each other, and said range stop assembly comprises a first control pin carried by one of said primary ring and said lens housing and positioned between a first circumferentially spaced pair of stops on the other of said primary ring and said lens housing, and a second control pin carried by one of said selector ring and said lens housing and positioned between a second pair of circumferentially spaced stops on the other of said selector ring and said lens housing, said second control pin being rotationally adjustable relative to said second pair of stops independent of the position of said first control pin relative to said first pair of stops thereby selecting the rotational position of one of said end limits.

9. The photographic lens of claim 8 wherein said first control pin is positioned on said primary ring to extend between said first pair of stops on said lens housing and said second control pin is positioned on said lens housing to extend between said second pair of stops on said selector ring, said first pair of stops and said second pair of stops being circumferentially spaced by substantially the same arcuate distances.

10. The photographic lens of claim 9 wherein said second pair of stops are formed on a stop ring movable axially with said at least one lens element in response to focus ring rotation, said second pair of stops each having sufficient axial dimension to maintain axial alignment with said second control pin throughout rotation of said focus ring between said end limits.

11. The photographic lens of claim 8 wherein said primary ring is operably coupled to displace said at least one lens element in response to rotation of said primary ring.

12. The photographic lens of claim 8 wherein said means for releasably securing said primary and selector rings against relative rotation releasably holds said rings in one of a plurality of relative rotational positions each corresponding with one of a plurality of selected ranges of focus setting adjustment.

13. The photographic lens of claim 8 wherein said selector ring is carried concentrically about said primary ring, said primary ring having one axial end thereof projecting at least slightly beyond the adjacent axial end of said selector ring to permit manual grasping of said selector ring.

14. The photographic lens of claim 8 further including means for preventing overrotation of said selector ring relative to said primary ring.

15. A photographic lens with variable range focus setting adjustment, comprising:
a lens housing;
at least one optical lens element supported within said lens housing for displacement therein to adjust the focus setting of the photographic lens;
a focus ring movably carried about said lens housing and operably coupled to said lens element to displace said lens element through a range of focus settings; and
a range stop assembly including means for limiting said focus ring to a prescribed range of movement relative to said lens housing to correspondingly limit the permitted range of focus setting adjustment, and means for selectively altering the range of focus ring movement relative to said lens housing to correspondingly alter the permitted range of focus setting adjustment.

16. The photographic lens of claim 15 wherein said range stop assembly includes first and second spaced stops on said lens housing, said first stop being defined by a generally stairstep configuration including a plurality of lands disposed at respectively different spacings from said second stop, a control pin on said focus ring and positioned between said first and second stops for respective engagement therewith when said focus ring is moved to the end limits of focus ring movement, and means for displacing said control pin for alignment with a selected one of said lands thereby selecting the permitted range of focus ring movement.

17. The photographic lens of claim 16 wherein said focus ring is rotatable about said lens housing, and wherein said first and second stops are circumferentially spaced from each other.

18. The photographic lens of claim 16 further including means for releasably securing said control pin at one of a plurality of positions each corresponding with alignment of said control pin with a respective one of said lands.

19. The photographic lens of claim 15 wherein:
said focus ring comprises a primary ring and a selector ring movable relative to each other and one being operably coupled to displace said at least one lens element, and means for releasably securing said primary and selector rings against relative movement; and said range stop assembly comprises a first control pin carried by one of said primary ring and said lens housing and positioned between a first circumferentially spaced pair of stops on the other of said primary ring and said lens housing, and a second control pin carried by one of said selector ring and said lens housing and positioned between a second pair of circumferentially spaced stops on the other of said selector ring and said lens housing, said second control pin being rotationally adjustable relative to said second pair of stops independent of the position of said first control pin relative to said first pair of stops thereby selecting the rotational position of one of said end limits.

20. The photographic lens of claim 19 wherein said primary and selector rings are rotatable relative to each other and with respect to said lens housing.

21. The photographic lens of claim 20 wherein said first control pin is positioned on said primary ring to extend between said first pair of stops on said lens housing and said second control pin is positioned on said lens housing to extend between said a second pair of stops on said selector ring, said first pair of stops and said second pair of stops being circumferentially spaced by substantially the same arcuate distances.

22. The photographic lens of claim 20 wherein said primary ring is operably coupled to displace said at least one lens element in response to rotation of said primary ring.

23. The photographic lens of claim 20 further including means for preventing overrotation of said selector ring relative to said primary ring.

24. A photographic lens with variable range focus setting adjustment, comprising:
a generally cylindrical lens housing supporting at least one optical lens element for axial displacement therein to adjust the focus setting of the photographic lens;

a focus ring rotatable about said lens housing and operably coupled to displace said at least one lens element through a range of focus settings in response to focus ring rotation; and a range stop assembly for adjustably selecting the permitted range of focus ring rotation to correspondingly select the permitted range of focus ring adjustment, said range stop assembly including, first and second circumferentially spaced stops on said lens housing, said first stop including a plurality of circumferentially and axially spaced lands, a control pin on said focus ring and positioned between said first and second stops for respective engagement therewith at the opposite end limits of focus ring rotation, and a selector switch mounted on said focus ring for axial displacement with respect thereto, said switch carrying said control pin for axially displacing said control pin for axial alignment with a selected one of said lands thereby selecting the permitted range of focus ring rotation.

25. The photographic lens of claim 24 further including means for releasably securing said selector switch in one of a plurality of axial positions each corresponding with alignment of said control pin with a respective one of said lands.

26. The photographic lens of claim 25 wherein said securing means comprises a spring-loaded member carried by said selector switch for releasable reception into one of a plurality of axially spaced detents formed in said focus ring.

27. The photographic lens of claim 24 wherein said first and second stops are formed on a stop ring movable axially with said at least one lens element in response to focus ring rotation, said second stop and each of said lands having sufficient axial dimension to maintain said control pin in axial alignment circumferentially between said second stop and said selected one of said lands throughout rotation of said focus ring between said end limits.

28. A photographic lens with variable range focus setting adjustment, comprising:

a generally cylindrical lens housing supporting at least one optical lens element for axial displacement therein to adjust the focus setting of the photographic lens;

a focus ring including a primary ring and a selector ring rotatable relative to each other and with respect to said lens housing, one of said rings being operably coupled to axially displace said at least one lens element through a range of focus settings, and means for releasably securing said primary and selector rings against rotation with respect to each other; and a range stop assembly for adjustably selecting the permitted range of focus ring rotation to correspondingly select the permitted range of focus ring adjustment, said range stop assembly including a first control pin carried by one of said primary ring and said lens housing and positioned between a first circumferentially spaced pair of stops on the other of said primary ring and said lens housing, and a second control pin carried by one of said selector ring and said lens housing and positioned between a second pair of circumferentially spaced stops on the other of said selector ring and said lens housing, said second control pin being rotationally adjustable relative to said second pair of stops independent of the position of said first control pin relative to said first pair of stops thereby selecting the rotational position of one of said end limits.

29. The photographic lens of claim 28 wherein said first control pin is positioned on said primary ring to extend between said first pair of stops on said lens housing and said second control pin is positioned on said lens housing to extend between said second pair of stops on said selector ring, said first pair of stops and said second pair of stops being circumferentially spaced by substantially the same arcuate distances.

30. The photographic lens of claim 29 wherein said second pair of stops are formed on a stop ring movable axially with said at least one lens element in response to focus ring rotation, said second pair of stops each having sufficient axial dimension to maintain axial alignment with said second control pin throughout rotation of said focus ring between said end limits.

31. The photographic lens of claim 28 wherein said primary ring is operably coupled to displace said at least one lens element in response to rotation of said primary ring.

32. The photographic lens of claim 28 further including means for preventing overrotation of said selector ring relative to said primary ring.

33. The photographic lens of claim 28 wherein said primary ring includes an index scale for movement relative to an index mark on said lens housing to indicate the focus setting position, said selector ring having indicia formed thereon to indicate the focus setting position of said one of said end limits.

* * * * *